US011270603B1

(12) United States Patent
Bansal et al.

(10) Patent No.: US 11,270,603 B1
(45) Date of Patent: Mar. 8, 2022

(54) REAL-TIME DISABILITY IDENTIFICATION AND PREFERENTIAL INTERACTION MODIFICATION

(71) Applicant: Bank of America Corporation, Charlotte, NC (US)

(72) Inventors: Gaurav Bansal, Telangana (IN); Mithun Kumar, Uttar Pradesh (IN); Chetan Singh Naruka, Haryana (IN); Akash Sambajee Rao Bhole, Karnataka (IN)

(73) Assignee: Bank of America Corporation, Charlotte, NC (US)

( * ) Notice: Subject to any disclaimer, the term of this patent is extended or adjusted under 35 U.S.C. 154(b) by 41 days.

(21) Appl. No.: 17/018,023

(22) Filed: Sep. 11, 2020

(51) Int. Cl.
*G06F 40/143* (2020.01)
*G06F 16/958* (2019.01)
*G09B 21/00* (2006.01)
*G06F 16/957* (2019.01)
*G06F 16/954* (2019.01)

(52) U.S. Cl.
CPC ......... *G09B 21/006* (2013.01); *G06F 16/954* (2019.01); *G06F 16/957* (2019.01); *G06F 16/958* (2019.01)

(58) Field of Classification Search
CPC ... G09B 21/006; G06F 16/958; G06F 16/957; G06F 16/954; G06F 40/143
USPC .................................................. 715/200, 234
See application file for complete search history.

(56) References Cited

U.S. PATENT DOCUMENTS

| | | |
|---|---|---|
| 6,922,726 B2 | 7/2005 | Basson et al. |
| 7,162,526 B2 | 1/2007 | Dutta et al. |
| 7,216,298 B1 | 5/2007 | Ballard et al. |
| 7,558,853 B2 | 7/2009 | Alcorn et al. |
| 7,676,762 B2 | 3/2010 | Shafron |
| 7,788,100 B2 | 8/2010 | Slotznick et al. |
| 7,788,603 B2 | 8/2010 | Lu et al. |
| 7,792,701 B2 | 9/2010 | Basson et al. |
| RE42,102 E | 2/2011 | Kopchik |
| 7,966,184 B2 | 6/2011 | O'Conor et al. |
| 8,024,227 B2 | 9/2011 | Howard et al. |
| RE43,070 E | 1/2012 | Henrie |
| 8,103,956 B2 | 1/2012 | Trujillo |
| 8,136,027 B2 | 3/2012 | Underwood et al. |
| 8,163,035 B2 | 4/2012 | Bhansali et al. |
| 8,595,300 B2 | 11/2013 | Underwood et al. |
| 8,608,487 B2 | 12/2013 | Huie et al. |
| 8,635,135 B2 | 1/2014 | Stevenson et al. |
| 8,744,852 B1 | 6/2014 | Seymour et al. |
| 8,812,532 B2 | 8/2014 | Skaf |

(Continued)

*Primary Examiner* — Manglesh M Patel (57) ABSTRACT

A system provides a webpage dynamically generated based on a disability of a user. The system detects a particular disability of a user attempting to access a webpage using a user device. The system sends a request to a server to modify the webpage based on the particular disability. The system determines whether the particular disability exists in a disability type database. In response to a determination that the particular disability does not exist in the disability type database, the system retrieves configurations to modify the webpage for the particular disability from the disability guideline database. The system dynamically modifies the webpage for the particular disability using the retrieved configurations. The system sends the dynamically modified webpage to the user device. The system displays the dynamically modified webpage on the web browser on the user device.

20 Claims, 3 Drawing Sheets

(56) References Cited

U.S. PATENT DOCUMENTS

| | | |
|---|---|---|
| 8,862,393 B2 | 10/2014 | Zhou et al. |
| 8,887,036 B2 | 11/2014 | Schultz et al. |
| 8,898,575 B2 | 11/2014 | Jain et al. |
| 8,924,335 B1 | 12/2014 | Trefler et al. |
| 9,152,392 B2 | 10/2015 | Petro et al. |
| 9,336,393 B2 | 5/2016 | Bhansali et al. |
| 9,432,403 B2 | 8/2016 | Cooper |
| 9,454,341 B2 | 9/2016 | Landry |
| 9,690,452 B2 | 6/2017 | Seliger et al. |
| 10,134,062 B2 | 11/2018 | Brown et al. |
| 10,491,448 B2 | 12/2019 | Bradbury et al. |
| 2002/0103914 A1 | 8/2002 | Dutta et al. |
| 2002/0156799 A1 | 10/2002 | Market et al. |
| 2007/0055938 A1 | 3/2007 | Herring et al. |
| 2007/0130510 A1 | 6/2007 | Dharamshi et al. |
| 2012/0254405 A1 | 10/2012 | Ganesh et al. |
| 2013/0325190 A1 | 12/2013 | Imes et al. |
| 2014/0058568 A1 | 2/2014 | Imes et al. |
| 2014/0244407 A1 | 8/2014 | Brown et al. |
| 2015/0113410 A1 | 4/2015 | Bradley et al. |
| 2015/0128164 A1 | 5/2015 | Fundament et al. |
| 2015/0256467 A1 | 9/2015 | Badiee et al. |
| 2016/0330084 A1 | 11/2016 | Hunter et al. |
| 2017/0031883 A1 | 2/2017 | Gupta et al. |
| 2017/0149795 A1 | 5/2017 | Day, II |
| 2018/0114189 A1 | 4/2018 | Farah |
| 2018/0295229 A1 | 10/2018 | Day, II et al. |
| 2019/0089829 A1 | 3/2019 | Nicholls et al. |

REAL-TIME DISABILITY IDENTIFICATION AND PREFERENTIAL INTERACTION MODIFICATION

TECHNICAL FIELD

The present disclosure relates generally to web development, and more specifically to a real-time disability identification and preferential interaction modification.

BACKGROUND

It is challenging for people with disabilities to navigate the Internet, access their accounts, shop online, etc. Current web development technologies are not configured to provide people with disabilities to perform their desired tasks on the Internet.

SUMMARY

In one embodiment, a system for providing a webpage dynamically generated based on a disability of a user is disclosed. The system includes a memory that is operable to store a disability type database which includes information associated with one or more disabilities including a visual disability, a partial visual disability, a hearing disability, and hand disability. The information associated with a particular disability from among the one or more disabilities include a type of the particular disability. The memory further stores a disability guideline database which includes configurations to modify webpages for each disability. The memory further stores website generation rules which include rules to create webpages modified based on the configurations. The rules to create the webpages for each disability includes functions to generate Hyper Text Markup Language (HTML) code of the webpages based on the configurations to modify webpages for each disability. The memory further stores a template repository which includes a plurality of templates of the webpages. Each template from among the plurality of templates of the webpage is associated with at least one different disability.

The system also includes a first processor that is associated with a user device and operably coupled to the memory. The first processor is configured to detect a particular disability of a particular user facing the user device attempting to access a webpage on a web browser. The particular disability of the particular user includes at least one of a visual disability or a hearing disability. The first processor sends a request to a server to modify the webpage based on the particular disability. The system also includes a second processor that is associated with the server. The second processor is configured to determine whether the particular disability exists in the disability type database. In response to a determination that the particular disability does not exist in the disability type database, the second processor sends a request to the disability guideline database to identify configurations to modify the webpage for the particular disability. The second processor receives configurations to modify the webpage for the particular disability. The second processor dynamically modifies the webpage for the particular disability using the received configurations. The second processor sends the dynamically modified webpage to the user device. The first processor is further configured to receive the dynamically modified webpage from the second processor. The first processor displays the dynamically modified webpage on the web browser on the user device.

Current web development technologies lack capabilities to provide people with disabilities to perform their desired tasks on the Internet, such as accessing their accounts, shopping online, etc. Thus, it is desired to provide a system that is configured to dynamically generate a webpage for a user who has a particular disability. Certain embodiments of this disclosure provide unique solutions to technical problems of the current web development technologies, including those problems described above. For example, the disclosed system provides several technical advantages, which include: 1) identifying a disability of a user in real-time using any of an image, video, and/or audio of the user; 2) dynamically generating a webpage based on the disability of the user who is attempting to visit the webpage; and 3) providing a more user-friendly dynamically generated webpage (based on the disability of the user) using feedback of users with the same or similar disability who have visited the webpage.

As such, this disclosure may improve the current web development technologies by providing dynamically generated webpages for uses with different disabilities. For example, a dynamically generated webpage for users with visual disabilities includes audio descriptions of text, images, and videos on the webpage. In another example, a dynamically generated webpage for users with partial visual disability includes enlarged font size of the text, sizes of the images, sizes of the videos, and sizes of other items (e.g., buttons, etc.) on the webpage. In another example, a dynamically generated webpage for users with hearing disability includes added text descriptions to the audios and videos on the webpage; and added sign language display to the audios and videos on the webpage. In another example, a dynamically generated webpage for users with hand disability includes facilitating to capture the voice of those users and use it to take commands and instructions of those users, such as navigating through the webpage, scrolling/moving up, scrolling/moving down, accessing links, selecting buttons, filling out forms, etc. Accordingly, the present disclosure provides webpages for users with disabilities so that they are able to perform their tasks on the Internet.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
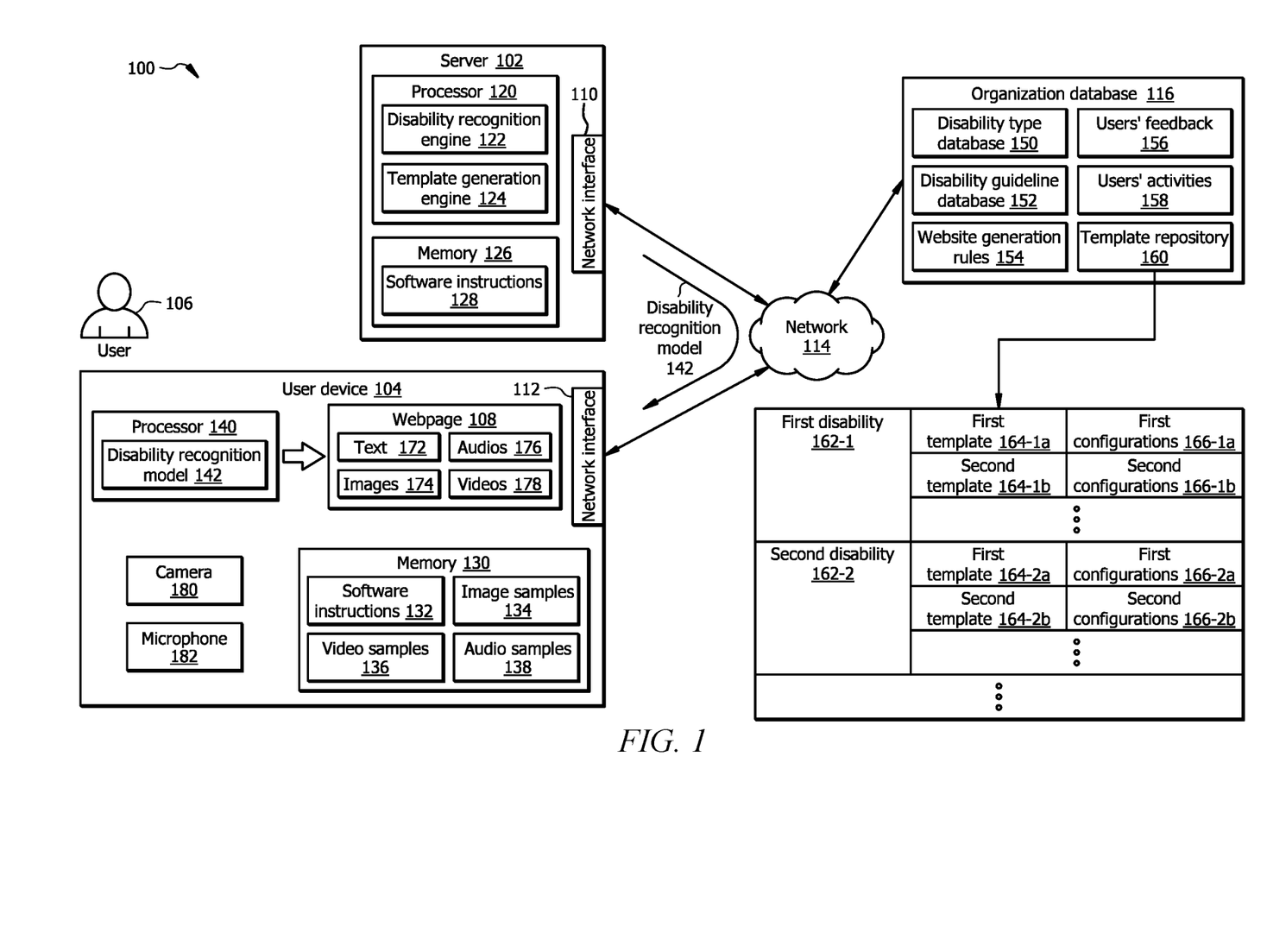
FIG. 1 illustrates one embodiment of a system configured to provide a webpage dynamically generated for a particular disability.

FIG. 1 illustrates one embodiment of a system 100 configured to provide a webpage 108 dynamically generated for a particular disability 162 of a user 106. In one embodiment, the system 100 comprises a server 102 that includes a processor 120 in signal communication with a memory 126 and a network interface 112. Memory 126 includes software instructions 128 that when executed by the processor 120 cause the server 102 to perform one or more functions described herein. The server 102 is configured to communicate with an organization database 116 via the network interface 110 through the network 114. In one embodiment, the processor 120 executes software instructions 128 to implement a disability recognition engine 122 and a template generation engine 124.

The system 100 further comprises a user device 104 that includes a processor 140 in signal communication with a memory 130 and a network interface 112. Memory 130 includes software instructions 132 that when executed by the processor 140 cause the user device 104 to perform one or more functions described herein. The user device 104 is configured to communicate with the organization database 116 via the network interface 112 through the network 114. In one embodiment, the processor 140 executes software instructions 132 to implement a disability recognition model 142. The organization database 116 stores a disability type database 150, a disability guideline database 152, website generation rules 154, users' feedback 156, users' activities 158, and a template repository 160 that provide information which may be used by software instructions 128 and 132 and/or processors 120 and 140. In other embodiments, system 100 may not have all of the components listed and/or may have other elements instead of, or in addition to, those listed above.

In general, the system 100 provides dynamically generated webpages 108 based on a different disability 162 of each user 106 who is attempting to access contents of the webpage 108. The system 100 improves experiences of users 106 with disabilities 162 in visiting and accessing webpages 108.

Server 102 is generally a server, or any other computing device configured to communicate with other computing devices, such as other servers, user devices (e.g., user devices 104), via the network interface 110 through the network 114. In one example, the server 102 may be a backend server associated with a particular organization that provide services and/or products to its customer or clients (e.g., users 106). In another example, the server 102 may be a backend server associated with a financial organization that provides a platform to its clients (e.g., users 106) to access their financial accounts, perform transactions, transfer funds to others, receive funds from others, etc. The server 102 (via the disability recognition engine 122) is configured to identify disabilities 162 associated with users 106. Details of the operations of the disability recognition engine 122 are described in FIG. 2. The server 102 (via the template generation engine 124) is configured to generate a plurality of templates 164 for webpages 108 of the website of the organization (for each disability 162) and store them in the template repository 160. Details of the operations of the template generation engine 124 are described in the template generation engine section in FIG. 1.

User device 104 is generally any computing device configured to communicate with other devices, such as other user devices 104, servers (e.g., server 102), databases (e.g., organization database 116), etc. via network interface 112 through the network 114. The user device 104 is configured to perform specific functions described herein and interact with users 106, e.g., via its user interfaces. Examples of the user device 104 include but are not limited to desktop computers, mobile phones, tablet computers, laptop computers, servers, etc. In one example, the user device 104 may be a smartphone that enables the user 106 to access the Internet to visit webpages 108. The user device 104 may be connected or integrated with a camera 180 and a microphone 182. The camera 180 is configured to capture image samples 134 and video samples 136 of the user 106, such as when the user 106 is facing the camera 180 associated with the user device 104. The microphone 182 is configured to capture the voice (or the audio) of the user 106, such as when the user 106 speaks to the microphone 182. The user device 104 stores the image samples 133, video samples 136, and audio samples 138 of the user 106 in the memory 130. The disability recognition model 142 uses these image samples 133, video samples 136, and audio samples 138 of the user 106 to identify and determine a disability of the user 106 who is attempting to access the webpage 108. Details of the operations of the disability recognition model 142 are described in conjunction with the operational flow of the disability recognition engine 122 described in FIG. 2.

User 106 may be any ordinary person with a disability 162 who is attempting to visit the webpage 108 on the website of the organization. The disability 162 may include a visual disability, a partial visual disability, a hearing disability, a hand disability, a learning disability, etc. Due to the disability 162, the user 106 may not be able to easily browse the Internet from the user device 104, access different webpages 170, and perform functions, such as shopping online, accessing his/her email accounts, accessing his/her financial accounts, accessing his/her social media accounts, etc. In some embodiments, the webpage 108 may be any webpage, a web application, or a software application associated with the organization that provides a platform to users 106 who are clients of the organization to perform the functions listed above. In a particular example, the user 106 may be a client of a financial organization who wishes to access his/her financial account from the user device 104. Thus, the user 106 may open a web browser and access his/her financial account from the software application/web application/webpage 108 associated with the financial organization. The software application/web application/webpage 108 may include a variety of content, such as text 172, images 174, audios 176, videos 178, etc., which users 106 with disabilities 162 may not be able to access at all or only partially. Thus, this disclosure contemplates dynamically generating templates 164 of the webpage 108 for users 106 with disabilities 162, so the webpage 108 is more accessible to them and provides a better user experience.

Each of the network interfaces 110 and 112 is configured to enable wired and/or wireless communications (e.g., via network 114). The network interface 110 is configured to communicate data between the server 102 and other devices (e.g., user devices 104), databases (e.g., organization database 116), systems, or domain(s). The network interface 112 is configured to communicate data between the user device 104 and other devices (e.g., server 102), databases (e.g., organization database 116), systems, or domain(s). For example, each of the network interfaces 110 and 112 may comprise a Wi-Fi interface, a local area network (LAN) interface, a wide area network (WAN) interface, a modem, a switch, or a router. The processor 120 is configured to send and receive data using the network interface 110. The processor 140 is configured to send and receive data using the network interface 112. Each of the network interfaces 110 and 112 may be configured to use any suitable type of communication protocol as would be appreciated by one of ordinary skill in the art.

Network 114 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 114 may be configured to support any suitable type of communication protocol as would be appreciated by one of ordinary skill in the art.

Organization database 116 may be implemented using any memory storage including but not limited to cloud-based memory storage comprising data centers, Network-Attached Storages (NAS), etc. The organization database 116 is configured to store the disability type database 150, disability guideline database 152, website generation rules 154, users' feedback 156, users' activities 158, and template repository 160. The disability type database 150 includes information associated with disabilities 162 for which the template generation engine 124 has already dynamically generated at least one template 164 of a webpage 108. For example, assume that a first user 106 with a particular disability 162 is visiting the webpage 108 from the user device 104. Also, assume that a user 106 with the same particular disability 162 has not yet visited the webpage 108. Thus, the template generation engine 124 generates a template 164 of the webpage 108 (which will be described further in FIG. 1) and sends it to the user device 104 for display. The template generation engine 124 stores the record of the first user 106 with the particular disability 162 visiting the webpage 108 in the disability type database 150. Thus, if a second user 106 with the same particular disability 162 visits the same webpage 108 later, the template generation engine 124 would be able to fetch the previously dynamically generated template 164 of the webpage 108 for the second user 106 with the same particular disability 162.

The disability guideline database 152 includes configurations 166 to modify webpages 108 for each disability 162. In one embodiment, the configurations 166 may include configurations disclosed in the Web Content Accessibility Guidelines (WCAG), Americans with Disabilities Act (ADA), international disability acts, etc. Each set of configurations 166 for a particular disability 162 indicates guidelines in modifying the webpages 108 to make them accessible to users 106 with the particular disability 162 and provide a better user experience to users 106 with the particular disability 162. Thus, each set of configurations 166 may be labeled with a particular disability 162. Some non-limiting examples of configurations 166 labeled with different disabilities 162 are described below.

For example, a set of configurations 166 labeled with visual disability 162 may specify adding audio captions to the text 172 and videos 178 displayed on the webpage 108. Further, in the example of visual disability 162, a second set of configurations 166 may specify adding audio descriptions to the images 174 displayed on the webpage 108. In another example, a set of configurations 166 labeled with visual disability/hand disability/limited movement disability 162 may specify facilitating to use the voice of the user 106 for navigating through the webpage 108, e.g., for scrolling/moving up, scrolling/moving down, accessing links, selecting buttons, filling out forms, etc.

In another example, a set of configurations 166 labeled with partial visual disability 162 may specify increasing the font sizes of the text 172, sizes of the images 174, and sizes of the videos 178 (e.g., by a particular percentage, such as 150%, 200%, etc.) which are displayed on the webpage 108.

In another example, a set of configurations 166 labeled with partial visual disability 162 may specify increasing contrasts of text 172, images 174, videos 178, and items (e.g., buttons, etc.) displayed on the webpage 108 (e.g., by a particular percentage, such as 150%, 200%, etc.).

In another example, a set of configurations 166 labeled with colorblindness disability 162 may specify colors and contrasts of the background, text 172, images 174, videos 178, and items (e.g., buttons, etc.) on the webpage 108, such that they are recognizable to the user 106 with the colorblindness disability 162.

In another example, a set of configurations 166 labeled with hearing disability 162 may specify adding text descriptions to audios 176 and videos 178 included in the webpage 108. In another example, a set of configurations 166 labeled with hearing disability 162 may specify adding a sign language display to audios 176 and videos 178 included in the webpage 108.

In another example, a set of configurations 166 labeled with learning disability 162 may specify changing the text 172 to be easier to comprehend, such as by replacing complicated words (or jargon) with easy synonyms, shortening the text 172 to convey the message of the text 172 in a shorter paragraph, etc. In another example, a set of configurations 166 labeled with learning disability 162 may specify to clearly indicate a success or a failure in performing a particular action (e.g., entering username and password) on the webpage 108 by signposts, such as displaying a red cross icon if the particular action does not take place, displaying a green tick icon if the particular action takes place successfully, etc. In another example, a set of configurations 166 labeled with learning/visual disability 162 may specify using spoken feedback on different actions being performed on the webpage 108, such as playing a positive feedback audio if an action takes place successfully, playing a negative feedback audio if the action does not take place. These examples of configurations 166 are not meant to limit the scope of the present disclosure. Other configurations 166 are contemplated by the present disclosure.

The website generation rules 154 includes rules to create webpages 108 modified using the configurations 166 stored in the disability guideline database 152. The rules to create webpages 108 for a particular disability 162 may include functions and scripts to generate code of the webpages 108 (using the configurations 166) to modify the webpages 108 for the particular disability 162. In some examples, these rules may be applied to any programming language in which the webpage 108 is written, such as, HTML, Java, JavaScript, Python, Ruby on Rails, etc. In some cases, the styles of the items displayed on the webpage 108 may also be modified in the Cascading Style Sheets (CSS) code associated with the HTML code of the webpage 108. Some non-limiting examples of website generation rules 154 for modifying HTML code of the webpage 108 for disabilities 162 using the configurations 166 are described below.

In the example of visual disability 162, rules to create a particular webpage 108 using the configurations 166 may include a function that fetches previously prepared audio descriptions of the text 172, images 174, and videos 178 of the webpage 108 from the organization database 116 and adds them to the HTML code of the webpage 108.

For example, the function adds the HTML code portion below to the HTML code of the webpage 108 for adding an audio description file to the webpage 108.

<audio src="/path/audio_description.mp3"> </audio>

In one embodiment, the audio descriptions of the text 172, images 174, and videos 178 may be previously prepared and stored in the organization database 116. In one example, the audio descriptions of the text 172, images 174, and videos 178 may be generated by using text-to-speech, image-to-speech, and video-to-speech machine learning techniques. In one embodiment, each of these machine learning techniques may include any combinations of a plurality of neural network (NN) layers, convolutional NN (CNN) layers, Long Short Term Memory (LSTM) layers, Recurrent NN (RNN) layers, etc. Each of these machine learning techniques may be trained by a training dataset which includes a plurality of text/images/videos with audio descriptions. Each of these machine learning techniques may use a Natural Language Processing (NLP) to understand the meaning of the audio descriptions of the text/images/videos in the training dataset and generate audio descriptions for them. After testing these machine learning techniques, they may be used to prepare the audio descriptions for the text 172, images 174, and videos 178 displayed on the webpage 108.

Further, in the example of visual and/or hand disability 162, rules to create a particular webpage 108 using the configurations 166 may include a user-interactive function that captures the voice of the user 106 from the microphone 182. The interactive function may use a speech recognition model to process the spoken words of the user 106. In one embodiment, the speech recognition model may include any combinations of a plurality of NN layers, CNN layers, LSTM layers, RNN layers, etc. The speech recognition model may be trained by a training dataset which includes a plurality of audio files labeled with their actual meaning or text. Once the speech recognition model is trained, it may be used to captures the voice of the user 106 from the microphone 182, understand the commands and instructions given by the user 106, and perform those commands and instructions. The commands and instructions of the user 106 may include navigating through the particular webpage 108, e.g., for scrolling/moving up, scrolling/moving down, accessing links, selecting button, filling out forms, etc. For example, the user 106 may say a command into the microphone 182, such as "scroll up," "scroll down," "go to the link sign in my account," "select button Yes," "type my username in field 1," etc. The user interface captures those commands of the user 106 and performs those commands.

In the example of partial visual disability 162, rules to create a particular webpage 108 using the configurations 166 may include a function to increase the font size of the text 172 displayed on the webpage 108. The function may be given the font size parameter of the text 172 in the HTML code of the webpage 106 as an input, where the font size parameter of the text 172 is parametrized as a string variable, such as: font-size01. The function may increase the font size parameter of the text 172 by a particular percentage, such as 150%, 200%, or any other value as indicated in a particular configurations 166 of modifying the text 172 for a user 106 with the partial visual disability 162.

Further, in the example of partial visual disability 162, rules to create a particular webpage 108 using the configurations 166 may include a function to increase sizes of the images 174 and videos 178 displayed on the webpage 108. The function may be given the dimensions of the images 174 and videos 178 in the HTML code of the webpage 106 as inputs, where the dimensions of the images 174 and videos 178 are parametrized as string variables, such as: image-width-size, image-height-size, video-width-size, video-height-size, respectively. The function may increase each of the dimensions of the images 174 and videos 178 by a particular percentage, such as 150%, 200%, or any other value as indicated in a particular configurations 166 of modifying the text 172 for a user 106 with the partial visual disability 162.

Further, in the example of partial visual disability 162, rules to create a particular webpage 108 using the configurations 166 may include a function to increase the contrasts of text 172, images 174, and videos 178 displayed on the particular webpage 108. The function may be given the contrast parameters of the contrasts of text 172, images 174, and videos 178 in the HTML code of the webpage 106 as inputs, where the contrast parameters of the text 172, images 174, and videos 178 are parametrized as string variables, such as: text-contrast, image-contrast, and video-contrast, respectively. The function may increase each of the contrast parameters of the text 172, images 174, and videos 178 by a particular percentage, such as 150%, 200%, or any other value as indicated in a particular configurations 166 of modifying the text 172 for a user 106 with the partial visual disability 162.

An exemplary HTML code portion of the webpage 108 with the parametrized font size of the text 172, and dimensions of the images 174 and videos 178 may be as below:

<html>
<h1 style="font-size: font-size01">text 172</h1>
<img src="image174.gif" width=image-width-size height=image-height-size> </img>
<video src="video178.mpeg" width=video-width-size height=video-width-size> </video>
</html>

In the example of hearing disability 162, rules to create a particular webpage 108 using the configurations 166 may include a function that fetches previously prepared audio descriptions of the audios 176 and videos 178 of the webpage 108 from the organization database 116 and adds them to the HTML code of the webpage 108. Further, in the example of hearing disability 162, rules to create a particular webpage 108 using the configurations 166 may include a function that fetches previously sign language displays of the audios 176 and videos 178 of the webpage 108 from the organization database 116 and adds them to the HTML code of the webpage 108.

In the example of colorblindness disability 162, rules to create a particular webpage 108 using the configurations 166 may include a function for specifying the colors and contrasts of the background, text 172, images 174, and videos 178 on the particular webpage 108. The function may be given the colors and contrast parameters of the background, text 172, images 174 and videos 178 as inputs, where the colors and contrast parameters of the background, text 172, images 174 and videos 178 are parametrized as string variables. The function may set each of those string variables by a particular value, as indicated in a particular configurations 166 of modifying the text 172 for a user 106 with the colorblindness disability 162.

In the example of learning disability 162, rules to create a particular webpage 108 using the configurations 166 may include a function to change the text 172 in the HTML code of the particular webpage 108 such that they are easy to understand. For example, the function may use an NLP technique to understand the text 172 and summarize them to be easier to understand. In one embodiment, the function may use an NLP summarization model. The NLP summarization model may include any combinations of a plurality of NN layers, CNN layers, LSTM layers, RNN layers, etc. The NLP summarization model may be trained by a training dataset which includes a plurality of text labeled with their summarizations. Once the NLP summarization model is trained, it may be used to summarize the text 172 on the webpage 108. The function may also be configured to replace complicated works (or jargon) with easy synonyms. Further, in the example of learning disability 162, rules to create a particular webpage 108 using the configurations 166 may include a function to clearly indicate a success or a failure in performing a particular action (e.g., entering username and password) on the particular webpage 108. For example, the function may add an HTML code portion to the HTML code of the particular webpage 108 that displays a red cross icon if the particular action does not take place. The function may also add an HTML code portion to the HTML code of the particular webpage 108 that displays a green tick icon if the particular action takes place. Further, in the example of learning disability 162, rules to create a particular webpage 108 using the configurations 166 may include a function for using spoken feedback on different actions being performed on the particular webpage 108. For example, the function may add an HTML code portion for playing a positive feedback audio if an action takes place successfully to the HTML code of the particular webpage 108. The function may also add an HTML code portion for playing a negative feedback audio if the action does not take place to the HTML code of the particular webpage 108. These examples of website generation rules 154 are not meant to limit the scope of the present disclosure. The present disclosure contemplates parameterizing any variable, argument, feature in a software/mobile/web application noted interchangeable herein as webpage 108. Other website generation rules 154 are contemplated by the present disclosure.

The users' feedback 156 includes feedback from users 106 with disabilities 162 who have visited the webpages 108 which have been dynamically created (by the template generation engine 124) based on their disabilities 162. The user feedback 156 will be used in choosing a preferred and a more user-friendly template 164 of the webpage 108 for a particular disability 162. Details of choosing a preferred and a more user-friendly template 164 of the webpage 108 are described in conjunction with the template generation engine 124 section described in FIG. 1 and in the method 300 described in the FIG. 3.

The users' activities 158 include any action that users 106 may perform while visiting the webpage 108, such as navigating through the webpage 108, accessing links, scrolling/moving up, scrolling/moving down, playing an audio 176, playing a video 178, filling out forms (e.g., username and password fields), selecting buttons, etc. These users' activities 158 will be used by the template generation engine 124 to improve the templates 164 of webpages 108 for each disability 162.

The template repository 160 includes a plurality of templates 164 of webpages 108 which have been dynamically generated by the template generation engine 124 using the configurations 166 and website generation rules 154 for each disability 162.

Processor 120 comprises one or more processors operably coupled to network interface 110, and memory 126. Processor 140 comprises one or more processors operably coupled to network interface 112, and memory 130. Each of the processors 120 and 140 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). Each of the processors 120 and 140 may be a programmable logic device, a microcontroller, a microprocessor, or any suitable combination of the preceding. The one or more processors are configured to process data and may be implemented in hardware or software. For example, each of the processors 120 and 140 may be 8-bit, 16-bit, 32-bit, 64-bit, or of any other suitable architecture. Each of the processors 120 and 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors in the processor 120 are configured to execute instructions (e.g., software instructions 128) to implement the disability recognition engine 122 and template generation engine 124. For example, the one or more processors in the processor 140 are configured to execute instructions (e.g., software instructions 132) to implement the disability recognition model 142. In this way, each of the processors 120 and 140 may be a special-purpose computer designed to implement the functions disclosed herein. In an embodiment, each of the processors 120 and 140 is implemented using logic units, FPGAs, ASICs, DSPs, or any other suitable hardware. Each of the processors 120 and 140 is configured to operate as described in FIGS. 1-3. For example, the processors 120 and 140 may be configured to perform the steps of method 300 as described in FIG. 3.

Each of the memories 126 and 130 may be volatile or non-volatile and may comprise a read-only memory (ROM), random-access memory (RAM), ternary content-addressable memory (TCAM), dynamic random-access memory (DRAM), and static random-access memory (SRAM). Each of the memories 126 and 130 may be implemented using one or more disks, tape drives, solid-state drives, and/or the like. Memory 126 is operable to store the software instructions 128, and/or any other data or instructions. The software instructions 128 may comprise any suitable set of instructions, logic, rules, or code operable to execute the processor 120. Memory 130 is operable to store the software instructions 132, image samples 134, video samples 136, audio samples 138, and/or any other data or instructions. The software instructions 132, image samples 134, video samples 136, and audio samples 138 may comprise any suitable set of instructions, logic, rules, or code operable to execute the processor 140.

Disability Generation Engine

Figure 2:
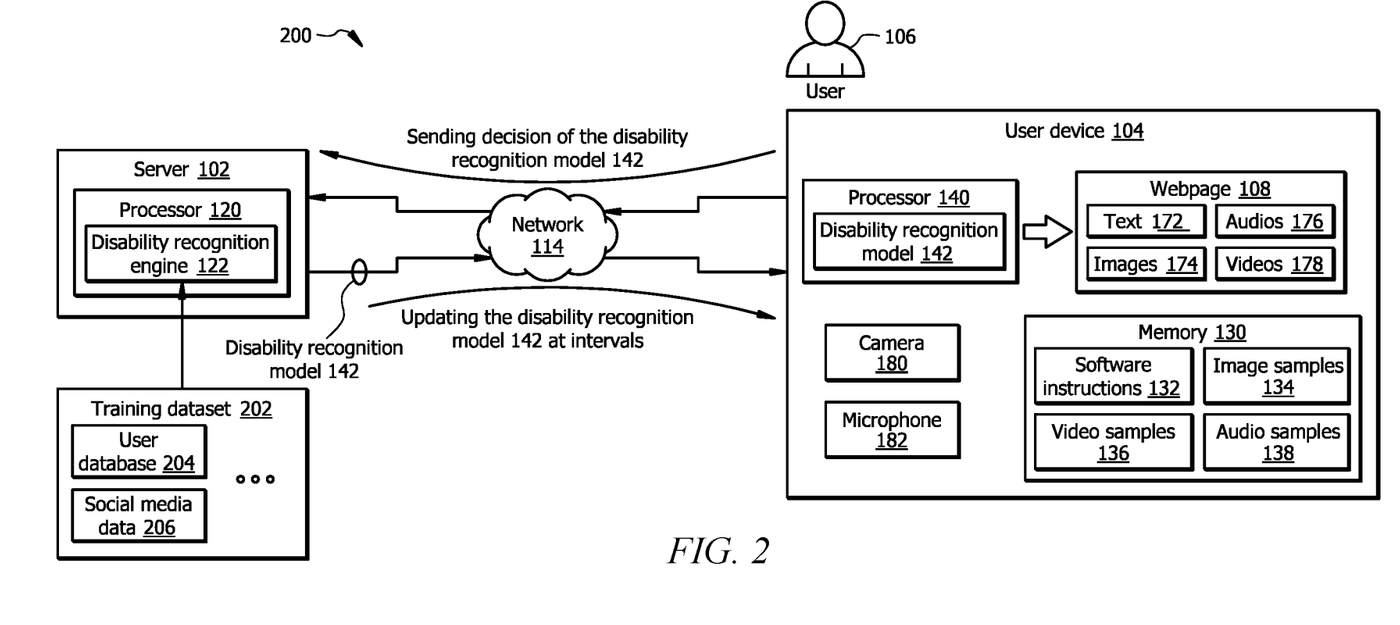
FIG. 2 illustrates an embodiment of an operational flow of a disability recognition engine.

FIG. 2 illustrates one embodiment of the operational flow of the disability recognition engine 122. Disability recognition engine 122 may be implemented by the processor 120 executing software instructions 128, and is configured to detect or identify disabilities 162 of users 106.

In one embodiment, the disability recognition engine 122 may be implemented using a plurality of NN layers, CNN layers, LSTM layers, RNN layers, and/or the like, in which weights and biases of perceptrons of these layers are optimized in the training, testing, and refining processes of the disability recognition engine 122. In other embodiments, the disability recognition engine 122 may be implemented using machine learning classification algorithms, such as Support Vector Machine (SVM), Naive Bayes, Logistic Regression, k-Nearest Neighbors, Decision trees, etc., in which each disability 162 is classified based on its type.

In one embodiment, the disability recognition engine 122 may be trained by a training dataset 202 which includes user database 204 (associated with the user 106), social media data 206 (associated with the user 106), etc. The user database 204 may include images and videos of the users 106 captured at physical locations of branches of the organization. In the example of a financial organization, the user database 204 may include images and videos of the users 106 captured by security cameras, when the users 106 have visited a branch of the financial organization for a banking transaction, when the users 106 have visited an Automated Teller Machine (ATM) terminal of the financial organization to perform a transaction, etc. In the example of an e-commerce or commerce organization, the user database 204 may include images and videos of the users 106 captured by security cameras when the users 106 have visited a branch of the organization to purchase a product or a service. The social media data 206 may include images, videos, and text that the users 106 have uploaded in their social media accounts, such as images and videos of the users 106 that were captured by cameras 180 of their user devices 104, audios of the users 106 that were captured by microphones 182 of their user devices 104, etc.

The disability recognition engine 122 processes the user database 204 and social media data 206 as the training dataset 202 in order to determine whether a user 106 has a particular disability 162 and if so, determine the type of that particular disability 162. Each item included in the training dataset 202 (i.e., each of the images, videos, and text of the users 106) may be labeled with a particular disability 162. In one example, an image of a first user 106 that shows the first user 106 is using a "foldable white cane" (which people with visual disability use to avoid objects and obstacles in their ways) and the first user 106 is wearing sunglasses, is labeled with the visual disability 162, indicating that the first user 106 may be blind in both eyes. In another example, a video of the second user 106 (e.g., captured by a security camera when the second user 106 visited a branch of the organization or fetched from a social media account of the second user 106) that shows the second user 106 is using his/her white cane to avoid obstacles and move around, is labeled with the visual disability 162. In another example, an image of a third user 106 (e.g., captured by a security camera when the third user 106 visited a branch of the organization or fetched from a social media account of the third user 106) that shows the right hand of the third user 106 is amputated, is labeled with the hand disability 162 with right hand amputated. In another example, an image of a fourth user 106 (e.g., captured by a security camera when the fourth user 106 visited a branch of the organization or fetched from a social media account of the fourth user 106) that shows the fourth user 106 is wearing a hearing aid, is labeled with the hearing disability 162. In another example, an audio file of a fifth user 106 (e.g., captured by a security camera when the fifth user 106 visited a branch of the organization or captured from a social medial account of the fifth user 106) may have features that indicate the fifth user 106 is deaf, such as a distorted speech, etc., is labeled with the hearing disability 162.

This comprehensive data gathered in the training dataset 202 is used to train the disability recognition engine 122. In the training process of the disability recognition engine 122, the disability recognition engine 122 is given a first portion of the training dataset 202 to learn the association and relationship between the images, videos, audios, and text in the first portion of the training dataset 202 with their corresponding labeled class of disability 162. In this process, the weights and biases of the neural network layers of the disability recognition engine 122 are adjusted and optimized.

Once the disability recognition engine 122 is trained, it is tested with a second portion of the training dataset 202 without their labeled class of disability 162 (to which the disability recognition engine 122 has not yet been exposed). In the testing process, the disability recognition engine 122 is given the second portion of the training dataset 202 and is asked to predict or classify the images, videos, audios, and text in the second portion of the training dataset 202 with the correct disability 162 based on the learned data from the training process.

The classification results from the testing process are then evaluated. In this process, the disability recognition engine 122 compares the predicted disability 162 of each images, videos, audios, and text in the second portion of the training dataset 202 with the actual disability 162 associated or labeled to them. If one or more of the mages, videos, audios, and text in the second portion of the training dataset 202 are not classified with the correct disability 162, the disability recognition engine 122 may be refined, e.g., by performing a backpropagation process in which one or more weight and bias values in the neural network layers of the disability recognition engine 122 are adjusted. In one embodiment, the disability recognition engine 122 may be refined by using a third portion of the training dataset 202 to which the disability recognition engine 122 has not yet been exposed. The disability recognition engine 122 may go through the training, testing, and refining process until the prediction result of identifying the correct disability 162 for each item in the training dataset 202 is above, e.g., 99%. In one embodiment, due to the large volume of data in the training dataset 202, the disability recognition engine 122 may be retrained, tested, and refined, for example, every month, every few months, or any other suitable period. The trained disability recognition engine 122 produces the disability recognition model 142 which includes the intelligence for identifying and recognizing disabilities 162 of the users 106.

Disability Recognition Model

The disability recognition model 142 may be implemented by the processor 140 executing software instructions 132, and is configured to detect or identify disabilities 162 of users 106. In one embodiment, the disability recognition model 142 may be implemented using a plurality of NN layers, CNN layers, LSTM layers, RNN layers, and/or the like.

The disability recognition model 142 may be implemented using Edge computing, which uses a distributed computing technique that brings computation and data closer to the location where it is needed (i.e., user devices 104). The disability recognition engine 122 uses Edge computing to improve a response time of receiving a decision of identifying a disability 162 of a user 106. Otherwise, in order to determine or identify a disability 162 of a user 106 who is attempting to access the webpage 108, data samples of the user 106 (e.g., the image samples 134, video samples 136, and/or audio samples 138, respectively captured by the camera 180 and the microphone 182), would have to be sent to the server 102. Then, the disability recognition engine 122 would identify the disability 162 of the user 106 and send its decision back to the user device 104. The response time of this process is long, since the data samples of the user 106 would have to travel from the user device 104 to the server 102 through the network 114 which may need a lot of network bandwidth depending on the size of those data samples. Thus, the intelligence of determining and identifying disabilities 162 of users 106 (from the disability recognition engine 122) is packaged in the disability recognition model 142 and sent to reside in the user device 104. For example, when the user 106 registers to become a client of the organization, the disability recognition engine 122 may transfer the disability recognition model 122 to be installed in the user device 104 of the user 106. The disability recognition model 142 (using the transferred intelligence of the disability recognition engine 122) is able to determine a disability 162 of a user 106 as he/she attempts to access a webpage 108 of the organization.

Determining a Disability of a User from an Image and/or a Video

For example, assume that the user 106 who has a disability 162 wishes to visit the webpage 108 (associated with the organization) from the user device 104 to access his/her account. In some embodiments, the user 106 may be asked by a pop-up message displayed on the webpage 108 to provide any image samples 134 and/or video samples 136. The camera 180 captures one or more image samples 134 and/or one or more video samples 136 of the user 106 and sends them to the disability recognition model 142. The disability recognition model 142 extracts relevant features of the image samples 134 and/or video samples 136 of the user 106 (using the transferred intelligence of the disability recognition engine 122). The disability recognition model 142 may then compare those extracted features with the features of the images and/or videos in the training dataset 202. If the disability recognition model 142 finds an image and/or a video labeled with a particular disability 162 with the similar features as the extracted features of the image samples 134 and/or video samples 136 of the user 106, the disability recognition model 142 determines that the user 106 has the particular disability 162.

For example, by extracting the features of the image samples 134 and/or video samples 136 of the user 106, the disability recognition model 142 may determine whether the user 106 is wearing sunglasses (which people with visual disability 162 would wear). In another example, the disability recognition model 142 may determine whether the user 106 is wearing thick farsighted/nearsighted medical glasses (which people with partial disability 162 would wear). In another example, the disability recognition model 142 may determine whether the user 106 is wearing an eyepatch over one eye (which indicates that he/she is blind in one eye and thus has visual disability 162). In another example, the disability recognition model 142 may determine whether the user 106 is wearing sunglasses which has a black lens only one side (which indicates that he/she is blind in one eye and thus has visual disability 162). In another example, the disability recognition model 142 may determine whether the user 106 is wearing a hearing aid.

In some embodiments, the user 106 may be asked by a pop-up message displayed on the webpage 108 to show his/her hands to determine whether he/she has a hand disability 162 and/or limited movement disability 162. Then, by extracting features of the image samples 134 and video samples 136 of the user 106 with his/her hands, the disability recognition model 142 may determine whether the user 106 has one or two amputated hands. Similar to as described above, the disability recognition model 142 then compares the features of the images and/or videos in the training dataset 202 with the extracted features of the image samples 134 and video samples 136 of the user 106. If disability recognition model 142 finds an image and/or a video with the same features labeled with hand disability 162 as the extracted features of the image samples 134 and video samples 136 of the user 106, it determines that the user 106 has hand disability 162.

Determining a Disability of a User from an Audio

In some embodiments, the user 106 may be asked by a pop-up message displayed on the webpage 108 to provide an audio samples 138. The microphone 182 captures one or more audio samples 138 of the user 106 and sends them to the disability recognition model 142. Similar to as described above, the disability recognition model 142 extracts the features of the audio samples 138 of the user 106 (using the transferred intelligence of the disability recognition engine 122). For example, by extracting features of the audio samples 138 of the user 106, the disability recognition model 142 may determine whether the user 106 has a distorted voice which people with hearing disability 162 would have.

In some embodiments, the disability recognition model 142 may determine a disability 162 of the user 106, e.g., by a series of tests displayed on a message window on the webpage 108). For example, the series of tests may include a cognitive-oriented test to determine whether the user 106 has a cognitive disability 162 or a learning disability 162. In another example, the series of tests may include a test to determine whether the user 106 has a colorblind disability 162 by displaying colored items and asking the user 106 to identify the colors of those items. Based on the results from the series of tests and the decision of the disability recognition model 142 (on determining the particular disability 162 of the user 106), particular configurations 166 and website generation rules 154 will be used to dynamically generate a webpage 108 that provide better user interfaces and content displays, such as sizes, contrasts, and colors of the text 172, images 174, videos 178, other items (e.g., buttons, etc.) to the user 106 with particular disability 162. Thereby, providing an overall better user experiences to the user 106 with particular disability 162.

Template Generation Engine

Referring back to FIG. 1, the template generation engine 124 may be implemented by the processor 120 executing software instructions 128, and is configured to generate templates 164 of webpages 108 for different disabilities 162. In one embodiment, the template generation engine 124 dynamically generates templates 164 of webpages 108 by modifying the HTML code of those webpages 108 according to the configurations 166 fetched from the disability guideline database 152 and the website generation rules 154. Some examples of the configurations 166 and rules for modifying the HTML code of the webpage 108 for different disabilities 162 are described above. The template generation engine 124 may use those examples and/or other configurations 166 and rules for modifying the HTML code of the webpage 108 for different disabilities 162 in dynamically generating templates 164 of the webpage 108 for different disabilities 162.

The template generation engine 124 is configured to determine a preferred and a more user-friendly template 164 of the webpage 108 for users 106 who have a particular disability 162 to provide a better experience visiting the webpage 108 to the user 106 with the particular disability 162.

Example of a Method for Generating Templates for a Webpage

The template generation engine 124 generates a plurality of templates 164 of the webpage 108 for a particular disability 162. In dynamically generating each template 164 of the webpage 108, the template generation engine 124 uses a different configuration 166 from the disability guideline database 152. As discussed above, each configuration 166 indicates guidelines in modifying the webpage 108 to be accessible and provide a better user experience to a user 106 with a particular disability 162. Assume, that a plurality of users 106 with the same disability 162 have visited the webpage 108 and they left their feedback indicating their experiences visiting the webpage 108. Also, assume that the template generation engine 124 has dynamically generated a different template 164 of the webpage 108 for each of those users 106. The template generation engine 124 stores that feedback in the users' feedback 156. The template generation engine 124 uses those users' feedback 156 to determine a template 164 of the webpage 108 which has received the most positive feedback from those users 106. Thus, when a next user 106 with the same particular disability 162 visits the webpage 108, the template generation engine 124 would choose the template 164 of the webpage 108 which has the most positive feedback from other users 106 with the same particular disability 162 who visited the webpage 108.

The template generation engine 124 also monitors and records the activities of the users 106 with a particular disability 162 while they are visiting the webpage 108. The template generation engine 124 stores those activities in the users' activities 158. The template generation engine 124 uses the users' activities 158 to improve the templates 164 of the webpage 108 for the particular disability 162. For example, assume that a user 106 with visual disability 162 is visiting the webpage 108. Thus, (using a particular set of configurations 166 and particular rules from the website generation rules 154) the template generation engine 124 generates a template 164 of the webpage 108 which includes audio captions added to the text 172, images 174, and videos 178 of the webpage 108. The template generation engine 124 monitors and records the activities of the user 106 while he/she is visiting the webpage 108. If the user 106 plays a particular audio caption (e.g., added to the text 172) a few times in a short period, the template generation engine 124 determines that the particular audio caption may need to be inspected for speed, quality, accuracy, etc. In the same example, assume that the template 164 of the webpage 108 includes a function to capture the voice of the user 106 for performing tasks on the webpage 108, such as filling out the username and password fields of his/her account. If the user 106 is not able to successfully access his/her account using the function that captures the voice of the user 106 a multiple times in a short period, the template generation engine 124 determines that the function for capturing the voice of the user 106 may need to be inspected.

In another example, assume that a user 106 with hearing disability 162 is visiting the webpage 108. Thus, the template generation engine 124 generates a template 164 of the webpage 108 includes sign language displays added to the images 174 and videos 178 of the webpage 108. The template generation engine 124 monitors and records the activities of the user 106 while he/she is visiting the webpage 108. If the user 106 plays a particular sign language display (e.g., added to the videos 178) a few times in a short period, the template generation engine 124 determines that the particular sign language display may need to be inspected for speed, quality, accuracy, etc.

Examples of generating different templates 164 of the webpage 108 for different disabilities 162 are described below.

In a first example, assume that a first user 106 with a hearing disability 162-1 is visiting the webpage 108. Also, assume that any user 106 with the same hearing disability 162-1 has not yet visited the webpage 108. The disability recognition model 122 (using the transferred intelligence of the disability recognition engine 122) identifies the hearing disability 162-1, e.g., from the image samples 134 and/or video samples 136, and sends its decision to the server 102. The template generation engine 124 fetches a first set of configurations 166-1*a* (labeled with hearing disability 162-1) from the disability guideline database 152 and particular rules (labeled with hearing disability 162-1) from the website generation rules 154 to modify the webpage 108 for the hearing disability 162-1. The template generation engine 124 dynamically generates or modifies the webpage 108 using the particular configurations 166-1*a* and the particular rules from the website generation rules 154. The template generation engine 124 then stores the dynamically generated or modified webpage 108 as a first template 164-1*a* of the webpage 108 for the hearing disability 162-1 in the template repository 160.

For example, the first configurations 166-1*a* used in the first template 164-1*a* of the webpage 108 labeled with the hearing disability 162-1 may indicate using a first font with a first font size in a first color (e.g., the Times New Roman font with the font size of 12 in the black color) for adding the text descriptions to the audios 176 and videos 178 of the webpage 108. The first template 164-1*a* may also include a first set of text descriptions added to the audios 176 and a second set of text descriptions added to the videos 178 of the webpage 108. The first template 164-1*a* may also include a first sign language display of transcribing the text 172, a second sign language display of transcribing the audios 176, and a third sign language display of transcribing the videos 178.

In a second example, assume that a second user 106 with the same hearing disability 162-1 is visiting the webpage 108, the template generation engine 144 may use a second configurations 166-1*b* (labeled with the hearing disability 162-1) and the particular rules (labeled with hearing disability 162-1) from the website generation rules 154 to modify the webpage 108 for the hearing disability 162-1. For example, the second configurations 166-1*b* used in the second template 164-1*b* of the webpage 108 associated with the hearing disability 162-1 may indicate using a second font with a second font size in a second color (e.g., the Calibri font with the font size 14 in the blue color) for adding the text descriptions to the audios 176 and videos 178 of the webpage 108.

In the two exemplary templates 164-1*a* and 164-1*b* of the webpage 108 for users 106 with hearing disability 162-1, the difference between the first configurations 166-1*a* and second configurations 166-1*b* is using different fonts, font sizes, font colors for adding the text descriptions to the audios 176 and videos 178 of the webpage 108. Assume that a plurality of users 106 with the hearing disability 162-1 has visited the webpage 108 and the template generation engine 124 has used different configurations 166-1 (labeled with the hearing disability 162-1) to modify the webpage 108. For example, the configurations 166-1 used in modifying the webpage 108 for users 106 with hearing disability 162-1 may differ in their characteristics of added text descriptions (e.g., fonts, font sizes, font colors, positions, etc.), characteristics of the sign language displays in the webpage 108 (e.g., positions, speeds, animations, sizes, colors, etc.), algorithms used in generating those text descriptions, algorithms used in generating those sign language displays, etc. Thus, the template generation engine 124 has generated a plurality of templates 164-1 of the webpage 108 for the hearing disability 162-1 using different configurations 166-1 (labeled with the hearing disability 162-1) and website generation rules 154 (labeled with the hearing disability 162-1). The template generation engine 124 has stored their activities and feedback while they were visiting the webpage 108 in the users' activities 158 and users' feedback 156, respectively. Thus, the template generation engine 124 may use those users' activities 158 and users' feedback 156 to determine a template 164-1 of the webpage 108 which has received the most positive feedback in the users' feedback 156 and based on the rate of successful actions indicated in the users' activities 158.

In a third example, assume that a third user 106 with visual disability 162-2 is visiting the webpage 108. Thus, the disability recognition model 122 (using the transferred intelligence of the disability recognition engine 122) identifies the visual disability 162-2, e.g., from the image samples 134 and/or video samples 136, and sends its decision to the server 102. The template generation engine 124 fetches configurations 166-2a (labeled with visual disability 162-2) and particular rules (labeled with visual disability 162-2) from the website generation rules 154 to modify the webpage 108 for the visual disability 162-2. The template generation engine 124 dynamically generates or modifies the webpage 108 for the visual disability 162-2 using the configurations 166-2a and the particular rules from the website generation rules 154. The template generation engine 124 then stores the dynamically generated or modified webpage 108 as a template 164-2a of the webpage 108 for the visual disability 162-2 in the template repository 160. For example, the configurations 166-2a used in the template 164-2a of the webpage 108 associated with the visual disability 162-2 may indicate using a first set of audio captions added to the text 172, a second set of audio captions added to the images 174, and a third set of audio captions added to the videos 178 of the webpage 108. The configurations 166-2a used in the template 164-2a may also indicate adding a user-interactive interface to the webpage 108 that captures the voice of the third user 106 and using it for navigation through the webpage 108, e.g., for scrolling/moving up, scrolling/moving down, accessing links, selecting button, filling out forms, etc.

In a fourth example, assume that a fourth user 106 with the visual disability 162-2 is visiting the webpage 108. Thus, the disability recognition model 122 (using the transferred intelligence of the disability recognition engine 122) identifies the visual disability 162-2, e.g., from the image samples 134 and/or video samples 136, and sends its decision to the server 102. The template generation engine 124 fetches a particular configurations 166-2b (labeled with visual disability 162-2) and particular rules (labeled with visual disability 162-2) from the website generation rules 154 to modify the webpage 108 for the visual disability 162-2. The template generation engine 124 dynamically generates or modifies the webpage 108 for the visual disability 162-2 using those configurations 166-2b and the particular rules from the website generation rules 154.

Assume that a plurality of users 106 with the visual disability 162-2 has visited the webpage 108 and the template generation engine 124 has used different configurations 166-2 (labeled with visual disability 162-2) to modify the webpage 108. For example, the configurations 166-2 used to modify the webpage 108 for users 106 with visual disability 162-2 may differ in their characteristics of added audio captions (e.g., speeds, the narrator in the audio captions, etc.), algorithms used in generating those audio captions, algorithms used in generating the user interface for capturing voice commands of the users 106, etc. Thus, the template generation engine 124 has generated a plurality of templates 164-2 of the webpage 108 using different configurations 166-2 (labeled with visual disability 162-2) from the disability guideline database 152 and rules (labeled with visual disability 162-2) in the website generation rules 154. The template generation engine 124 has stored their activities and feedback while they were visiting the webpage 108 in the users' activities 158 and users' feedback 156, respectively. Thus, the template generation engine 124 may use those users' activities 158 and users' feedback 156 to determine a template 164-2 of the webpage 108 for the visual disability 162-2 which has received the most positive feedback in the users' feedback 156 and based on the rate of successful actions indicated in the users' activities 158.

Figure 3:
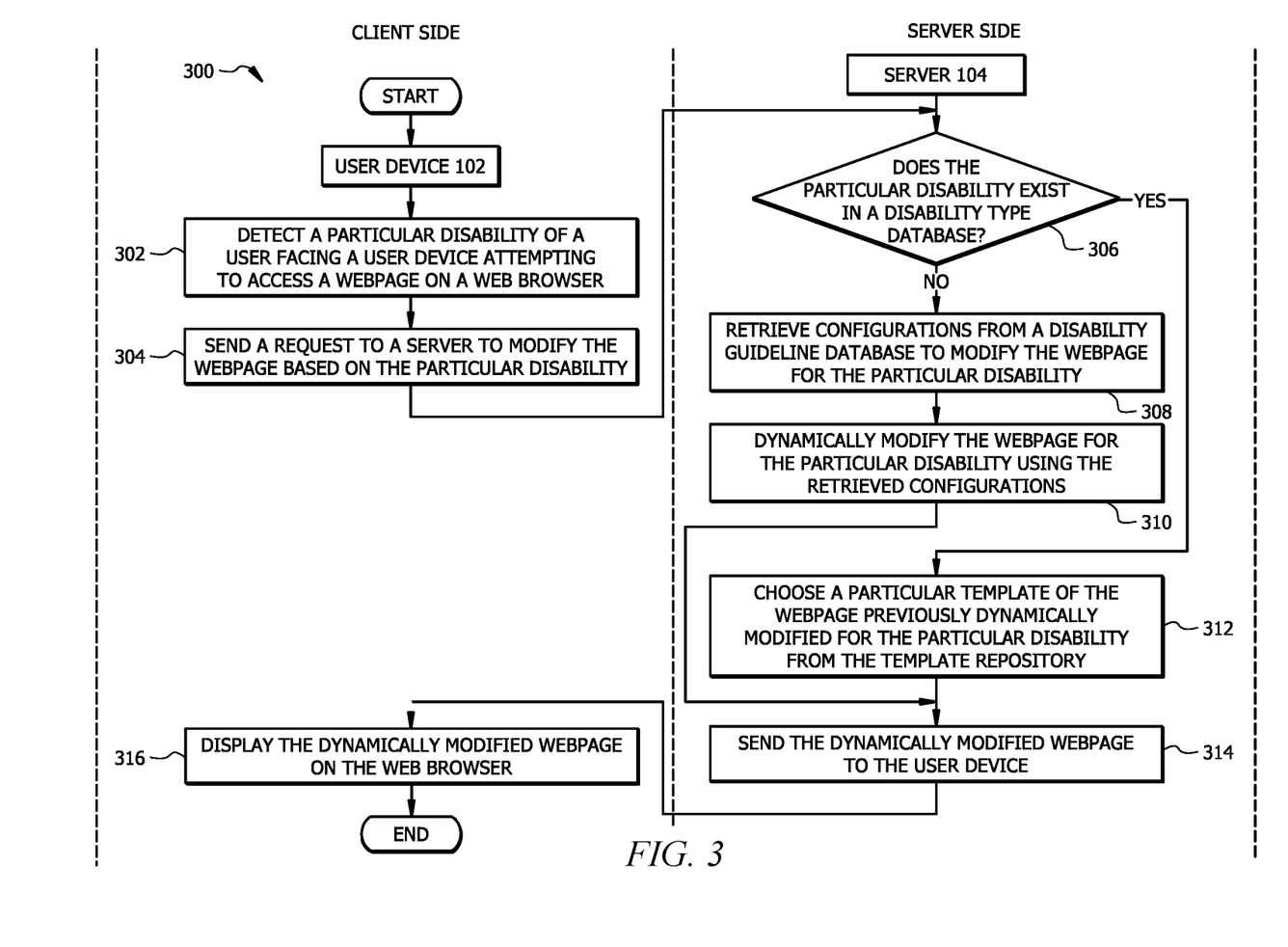
FIG. 3 illustrates an example of a flow chart of a method for providing a webpage dynamically generated for a particular disability.

Example of a Method for Providing a Webpage Dynamically Generated Based on a Disability of a User FIG. 3 illustrates a flow chart of a method 300 for providing a webpage 108 dynamically generated based on a disability 162 of a user 106. One or more of steps 302-316 of the method 300 may be implemented, at least in part, in the form of software instructions 128 and 132 stored on non-transitory, tangible, machine-readable media (e.g., memories 126 and 130) that when run by one or more processors (e.g., processors 120 and 140) may cause the one or more processors to perform steps 302-316. In some embodiments, method 300 may be performed by system 100 of FIG. 1, including the server 102, user device 104, processor 120, processor 140, disability recognition engine 122, template generation engine 124, and disability recognition model 142. Aspects of the steps 302-316 of the method 300 have been covered in the description for FIGS. 1-2; and additional aspects are provided below.

The method 300 begins at step 302 where the disability recognition model 142 detects a disability 162 of a user 106 when the user 106 is facing the user device 104 attempting to visit the webpage 108 on a web browser, such as described in FIG. 2. In this process, the disability recognition model 142 receives one or more image samples 134 of the user 106 and/or one or more video samples 136 of the user 106 captured from the camera 180. The disability recognition model 142 may also receive one or more audio samples 138 of the user 106 captured by the microphone 182. The disability recognition model 142 extracts the features of those received image samples 134/video samples 136/audio samples 138. The disability recognition model 142 compares the extracted features of those received image samples 134/video samples 136/audio samples 138 with the features of the images/videos/audios included in the training dataset 202 (where each of the images/videos/audios in the training dataset 202 is labeled with a particular disability 162). If the extracted features of those received image samples 134/video samples 136/audio samples 138 match the features of an image/video/audio (labeled with a particular disability 162) in the training dataset 202, the disability recognition model 142 determines that the user 106 has the particular disability 162.

In step 304, the disability recognition model 142 sends a request to the server 102 to modify or generate the webpage 108 based on the particular disability 162 of the user 106.

In step 306, the template generation engine 124 determines whether the particular disability 162 of the user 106 exists in the disability type database 150. The template generation engine 124 determines whether the particular disability 162 exists in the disability type database 150, if a user 106 with the same particular disability 162 has previously visited the webpage 108 and thus the template generation engine 124 has already dynamically generated a template 164 of the webpage 108 for that user 106 with the same particular disability 162. Thus, the template generation engine 124 checks the disability type database 150 and searches if there is a record of a user 106 with the same particular disability 162 visiting the webpage 108.

If the template generation engine 124 does not find a record of a user 106 with the same particular disability 162 visiting the webpage 108 in the disability type database 150, it determines that the particular disability 162 does not exist in the disability type database 150. In this case, the method 300 proceeds to perform the steps 308, 310, 314, and 316.

In step 308, the template generation engine 124 retrieves particular configurations 166 from the disability guideline database 152 to modify the webpage 108 for the particular disability 162. In this process, the template generation engine 124 identifies the particular configurations 166 which is labeled with the particular disability 162. The particular configurations 166 includes guidelines for modifying the webpage 108 in order to make the webpage 108 accessible to the user 106 with the particular disability 162, as described in FIGS. 1 and 2.

In step 310, the template generation engine 124 dynamically generates or modifies the webpage 108 for the particular disability 162 using the particular configurations 166. In this process, the template generation engine 124 uses particular rules (labeled with the particular disability 162) from the website generation rules 154. The particular rules labeled with the particular disability 162 include functions to modify the HTML code of the webpage 108 using the configurations 166 labeled with the particular disability 162, as described in FIGS. 1 and 2.

Returning to step 306, if the template generation engine 124 finds a record of a user 106 with the same particular disability 162 visiting the webpage 108 in the disability type database 150, it determines that the particular disability 162 exists in the disability type database 150. In this case, the method 300 proceeds to perform the steps 312, 314, and 316.

In step 312, the template generation engine 124 chooses a particular template 164 of the webpage 108 from the template repository 160 which the template generation engine 124 has already dynamically generated for the particular disability 162 of the user 106. The template generation engine 124 chooses the particular template 164 of the webpage 108 for the particular disability 162, such as described in FIGS. 1 and 2.

For example, assume that in step 306, the template generation engine 124 has determined that the particular disability 162 exists in the disability type database 150. Thus, the template generation engine 124 chooses a previously dynamically generated template 164 of the webpage 108 for the particular disability 162 from the template repository 160. In this process, the template generation engine 124 may choose a template 164 of the webpage for the particular disability 162 which has received the most positive feedback from the users 106 with the same particular disability 162 who have visited the webpage 108, such as described in FIGS. 1 and 2.

In step 314, the template generation engine 124 sends the dynamically modified webpage 108 to the user device 104.

In step 316, template generation engine 124 displays the dynamically modified webpage 108 on the web browser on the user device 104.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:
1. A system for providing a webpage dynamically generated based on a disability of a user, comprising:
   a memory operable to store:
      a disability type database comprising information associated with one or more of a visual disability, a partial visual disability, a hearing disability, and hand disability, wherein information associated with a particular disability from among the one or more disabilities comprise a type of the particular disability;
      a disability guideline database comprising configurations to modify webpages for each disability; and
      website generation rules comprising rules to create webpages modified based on the configurations, wherein the rules to create the webpages for each disability comprise functions to generate HTML code of the webpages based on the configurations to modify webpages for each disability;
      a template repository comprising a plurality of templates of the webpage, wherein each template from among the plurality of templates of the webpage is associated with at least one different disability;
   a first processor, associated with a user device, operably coupled to the memory, configured to:
      detect a particular disability of a particular user facing the user device attempting to access a webpage on a web browser, wherein the particular disability of the particular user comprises at least one of a visual disability or a hearing disability;
      send a request to a server to modify the webpage based on the particular disability; and
   a second processor associated with the server, the second processor configured to:
      determine whether the particular disability exists in the disability type database;
         in response to a determination that the particular disability does not exist in the disability type database:
            retrieve configurations to modify the webpage for the particular disability from the disability guideline database; and dynamically modify the webpage for the particular disability using the retrieved configurations;
send the dynamically modified webpage to the user device;
the first processor is further configured to:
receive the dynamically modified webpage from the second processor; and
display the dynamically modified webpage on the web browser on the user device.

2. The system of claim 1, wherein the second processor is further configured to:
develop a disability recognition model, wherein:
the disability recognition model comprises information to determine a disability of a user using an image of the user included in a training dataset;
the training dataset comprises images of different users captured from cameras of user devices associated with the different users, and images of the different users captured from social media platforms associated with the different users;
send the disability recognition model to the first processor to detect the disability of the user; and
update the disability recognition model at configurable time intervals.

3. The system of claim 1, wherein the second processor is further configured to:
develop a disability recognition model, wherein:
the disability recognition model comprises information to determine a disability of a user using an audio of the user included in a training dataset;
the training dataset comprises audios of different users captured from microphones of user devices associated with the different users, and audios of the different users captured from social media platforms associated with the different users;
send the disability recognition model to the first processor to detect the disability of the user; and
update the disability recognition model at configurable time intervals.

4. The system of claim 1, wherein the second processor is configured to choose a particular template of the webpage based on feedback received from different users with different disabilities accessing the webpage, wherein:
the different templates of the webpage for different disabilities are stored in the template repository; and
the different templates of the webpage for different disabilities comprise:
a first template associated with a first hearing disability comprises a first text in a first font with a first font size in a first color and a first button with a first button size and a first text description added to a first image, a second text description added to a first audio, and a third text description added to a first video within the webpage; and
a second template associated with a first visual disability comprises a first audio caption added to a text, a second audio caption added to an image, and a third audio caption added to a video within the webpage.

5. The system of claim 1, wherein detecting the particular disability of the particular user facing the user device comprises:
capturing an image of the particular user using a camera of the user device;
extracting features of the image by a disability recognition model;
comparing the features of the captured image of the particular user with features of images stored in a training dataset, wherein each image stored in the training dataset indicates a disability of a user;
determining whether the features of the captured image match features of any of the images stored in the training dataset; and
in response to determining that the features of the captured image match features of an image stored in the training dataset, determining that the particular user has the disability indicated in the image stored in the training dataset.

6. The system of claim 1, wherein detecting a particular disability of the particular user facing the user device further comprises:
capturing an audio sample of the particular user using a microphone of the user device;
extracting features of the captured audio sample by a disability recognition model;
comparing the features of the audio sample of the particular user with features of audio samples stored in a training dataset, wherein each audio sample stored in the training dataset indicates a disability of a user;
determining whether the features of the captured audio sample match features of any of the audio samples stored in the training dataset; and
in response to determining that the features of the captured audio sample match features of an audio sample stored in the training dataset, determining that the particular user has the disability indicated in the audio sample stored in the training dataset.

7. The system of claim 1, wherein configurations for modifying the webpage for a partial visual disability comprise:
an indication that specifies a particular range of font sizes to be used for text displayed on the webpage;
an indication that specifies a particular range of contrasts to be used for items displayed on the webpage, wherein the items displayed on the webpage comprise text, images, videos, and buttons.

8. The system of claim 1, wherein configurations for modifying the webpage for a visual disability comprise:
an indication that specifies to add audio captions to text displayed on the webpage;
an indication that specifies to add audio descriptions to images displayed on the webpage; and
an indication that specifies to use voice of the particular user for navigating though the webpage, wherein the navigation through the webpage comprises moving up, moving down, accessing links, selecting buttons, and filling out forms.

9. The system of claim 1, wherein configurations for modifying the webpage for a hearing disability comprise:
an indication that specifies to add text descriptions to audios included in the webpage;
an indication that specifies to add text descriptions to videos with audio included in the webpage;
an indication that specifies to add a sign language display to audios included in the webpage; and
an indication that specifies to add a sign language display to videos with audio included in the webpage.

10. The system of claim 1, wherein the first processor is further configured to:
store activities of the particular user on the webpage in the memory, wherein the activities of the particular user comprise navigating through the webpage and accessing links on the webpage;
receive feedback from the particular user on the dynamically modified webpage; and use the feedback in choosing a template of the webpage for other users with a similar disability.

11. The system of claim 1, wherein the second processor is further configured to:
in response to a determination that the particular disability exists in the disability type database:
choose a particular template of the webpage associated with the particular disability from the template repository; and
send the dynamically modified webpage to the user device.

12. A method for providing a webpage dynamically generated based on a disability of a user, comprising:
detecting, by a first processor, a particular disability of a particular user facing a user device attempting to access a webpage on a web browser, wherein the particular disability of the particular user comprises at least one of a visual disability or a hearing disability;
sending, by the first processor, a request to a server to modify the webpage based on the particular disability;
determining, by a second processor, whether the particular disability exists in a disability type database;
in response to determining that the particular disability does not exist in the disability type database:
retrieving configurations to modify the webpage for the particular disability from a disability guideline database; and
dynamically modifying the webpage for the particular disability using the retrieved configurations;
sending, by the second processor, the dynamically modified webpage to the user device;
receiving, by the first processor, the dynamically modified webpage from the second processor; and
displaying, by the first processor, the dynamically modified webpage on the web browser on the user device.

13. The method of claim 12, wherein the method further comprises:
developing a disability recognition model, wherein:
the disability recognition model comprises information to determine a disability of a user using an image of the user included in a training dataset; and
the training dataset comprises images of different users captured from cameras of user devices associated with the different users, and images of the different users captured from social media platforms associated with the different users;
sending the disability recognition model to the first processor to detect the disability of the user; and
updating the disability recognition model at configurable time intervals.

14. The method of claim 12, wherein the method further comprises:
developing a disability recognition model, wherein:
the disability recognition model comprises information to determine a disability of a user using an audio of the user included in a training dataset; and
the training dataset comprises audios of different users captured from microphones of user devices associated with the different users, and audios of the different users captured from social media platforms associated with the different users;
sending the disability recognition model to the first processor to detect the disability of the user; and
updating the disability recognition model at configurable time intervals.

15. The method of claim 12, wherein the method further comprises:
choosing a particular template of the webpage based on feedback received from different users with different disabilities accessing the webpage, wherein:
the different templates of the webpage for different disabilities are stored in a template repository; and
the different templates of the webpage for different disabilities comprises:
a first template associated with a first hearing disability comprises a first text in a first font with a first font size in a first color and a first button with a first button size and a first text description added to a first image, a second text description added to a first audio, and a third text description added to a first video within the webpage; and
a second template associated with a first visual disability comprises a first audio caption added to a text, a second audio caption added to an image, and a third audio caption added to a video within the webpage.

16. The method of claim 12, wherein detecting the particular disability of the particular user facing the user device comprises:
capturing an image of the particular user using a camera of the user device;
extracting features of the image by a disability recognition model;
comparing the features of the captured image of the particular user with features of images stored in a training dataset, wherein each image stored in the training dataset indicates a disability of a user;
determining whether the features of the captured image match features of any of the images stored in the training dataset; and
in response to determining that the features of the captured image match features of an image stored in the training dataset, determining that the particular user has the disability indicated in the image stored in the training dataset.

17. The method of claim 12, wherein detecting a particular disability of the particular user facing the user device further comprises:
capturing an audio sample of the particular user using a microphone of the user device;
extracting features of the captured audio sample by a disability recognition model;
comparing the features of the audio sample of the particular user with features of audio samples stored in a training dataset, wherein each audio sample stored in the training dataset indicates a disability of a user;
determining whether the features of the captured audio sample match features of any of the audio samples stored in the training dataset; and
in response to determining that the features of the captured audio sample match features of an audio sample stored in the training dataset, determining that the particular user has the disability indicated in the audio sample stored in the training dataset.

18. The method of claim 12, wherein configurations for modifying the webpage for a partial visual disability comprise:
an indication that specifies a particular range of font sizes to be used for text displayed on the webpage;
an indication that specifies a particular range of contrasts to be used for items displayed on the webpage, wherein the items displayed on the webpage comprise text, images, videos, and buttons.

19. The method of claim 12, wherein configurations for modifying the webpage for a visual disability comprise:
- an indication that specifies to add audio captions to text displayed on the webpage;
- an indication that specifies to add audio descriptions to images displayed on the webpage; and
- an indication that specifies to use voice of the particular user for navigating though the webpage, wherein the navigation through the webpage comprises moving up, moving down, accessing links, selecting buttons, and filling out forms.

20. The method of claim 12, wherein configurations for modifying the webpage for a hearing disability comprise:
- an indication that specifies to add text descriptions to audios included in the webpage;
- an indication that specifies to add text descriptions to videos with audio included in the webpage;
- an indication that specifies to add a sign language display to audios included in the webpage; and
- an indication that specifies to add a sign language display to videos with audio included in the webpage.

\* \* \* \* \*